US007563309B2

(12) United States Patent
Simpson, Jr.

(10) Patent No.: US 7,563,309 B2
(45) Date of Patent: Jul. 21, 2009

(54) METHOD AND APPARATUS FOR REGENERATING ENGINE EXHAUST FILTERS

(75) Inventor: Peyton G. Simpson, Jr., Dallas, TX (US)

(73) Assignee: Pollution Control Products Co., Dallas, TX (US)

( * ) Notice: Subject to any disclaimer, the term of this patent is extended or adjusted under 35 U.S.C. 154(b) by 0 days.

(21) Appl. No.: 12/121,990

(22) Filed: May 16, 2008

(65) Prior Publication Data

US 2008/0216468 A1   Sep. 11, 2008

Related U.S. Application Data

(63) Continuation of application No. 11/042,399, filed on Jan. 25, 2005, now Pat. No. 7,390,338.

(51) Int. Cl.
*B01D 46/00* (2006.01)
*F01N 3/023* (2006.01)

(52) U.S. Cl. .................. 95/278; 55/282.3; 55/385.3; 55/523; 55/DIG. 10; 55/DIG. 30; 60/274; 60/311; 110/345

(58) Field of Classification Search .................. 55/282.2, 55/282.3, 385.3, 523, DIG. 10, DIG. 30; 95/278; 60/274, 311; 432/72; 110/344, 110/345
See application file for complete search history.

(56) References Cited

U.S. PATENT DOCUMENTS 4,270,898 A * 6/1981 Kelly ................ 432/72

| 4,276,071 | A | * | 6/1981 | Outland .............. 55/523 |
| 4,544,388 | A | | 10/1985 | Rao et al. |
| 4,875,335 | A | | 10/1989 | Arai et al. |
| 4,881,959 | A | | 11/1989 | Kono et al. |
| 5,171,341 | A | | 12/1992 | Merry |
| 5,251,564 | A | * | 10/1993 | Rim et al. ............ 110/344 |
| 5,397,550 | A | | 3/1995 | Marino, Jr. |
| 5,976,225 | A | | 11/1999 | Nystrom et al. |
| 6,120,583 | A | | 9/2000 | Saito et al. |
| 6,471,918 | B1 | | 10/2002 | Sherwood |
| 7,073,327 | B2 | | 7/2006 | Hashimoto et al. |
| 7,160,355 | B2 | | 1/2007 | Steiner |

FOREIGN PATENT DOCUMENTS

JP    4-295120    10/1992

* cited by examiner

*Primary Examiner*—Jason M Greene
(74) *Attorney, Agent, or Firm*—Scott C. Sample; Gardere Wynne Sewell LLP

(57) ABSTRACT

Internal combustion engine exhaust filter devices and the like are regenerated by placement in a reclamation or burn-off furnace, raising the temperature to at least about 800° F. to 900° F. and conducting relatively low volumes of low pressure air through the filter media to combust entrapped particulates and other materials residing on the filter media. The reclamation furnace includes an afterburner for combusting materials discharged from the filter devices into the furnace chamber so that complete combustion of materials is accomplished before discharge from the furnace. The flow of combustion air for the filter devices is controlled by manifolding and valving connected to a source and the oxygen content of combustion air may be enhanced by a separate source of oxygen injected into the combustion air flow stream.

9 Claims, 1 Drawing Sheet

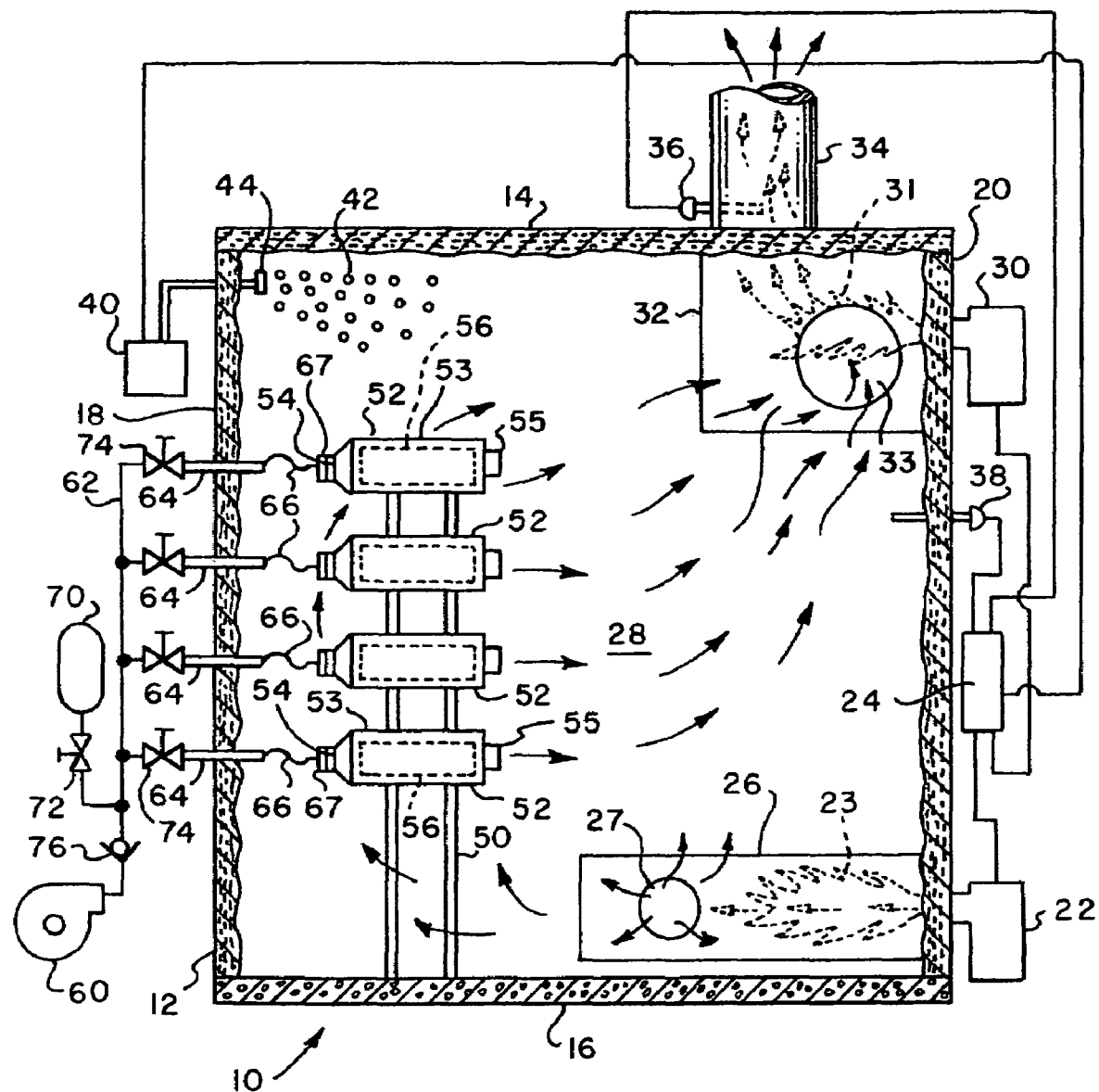

METHOD AND APPARATUS FOR REGENERATING ENGINE EXHAUST FILTERS

RELATED APPLICATIONS

This application is a continuation application of U.S. patent application Ser. No. 11/042,399, filed Jan. 25, 2005, now U.S. Pat. No. 7,390,338, which is incorporated by reference herein and to which priority is claimed.

BACKGROUND OF THE INVENTION

Regulatory authorities around the world have established that emissions from internal combustion engines, including gasoline and diesel engines, will be regulated. Diesel and gasoline engine exhaust streams present unique filtration problems. The only solution to these problems is the development of a particulate (soot) filter to extract particulate material from the exhaust stream. However, filters which include fluid and particulate filtration media, typically ceramic honeycomb type structures, eventually become clogged with matter trapped by the media and such filters must either be discarded or subjected to a time consuming and expensive regeneration or cleaning process. The capital cost of such filters is not inconsequential, as compared with conventional engine intake air filters and the like, for example. Accordingly, discarding engine exhaust filters is expensive and regeneration of the filter media is desirable. The present invention provides an improved method and apparatus for regenerating or cleaning filters, including ceramic filters for gasoline and diesel engines, in particular.

SUMMARY OF THE INVENTION

The present invention provides an apparatus for cleaning or regenerating fluid filters, particularly internal combustion engine exhaust filters constructed of metal or ceramic housings and typically including ceramic porous filter media disposed therein.

The present invention also provides an improved method for regenerating or cleaning filters, particularly exhaust filters which are subject to accumulations of soot and other particulates generated during the combustion of hydrocarbon fuels in reciprocating piston and turbine engines.

In accordance with one aspect of the present invention, a furnace is provided for producing substantial heat to be transmitted to engine exhaust filter devices and the like which are placed within the furnace, the filter devices being subjected to a substantial temperature rise over the exterior thereof and substantial heating of the filter media. Material trapped by the filter media is removed by incineration from the heat generated by the furnace and from pumping a quantity of combustion air to the interior of the filter device to incinerate accumulated soot, and other particulate matter which has been trapped by the filter media. Combustion products from incinerating material accumulated on the filter media are conducted through a suitable treatment process as part of the furnace operation, which process includes flow of filter combustion products and other material through an afterburner for further incineration of material removed from the filter media.

In accordance with another aspect of the present invention, a somewhat conventional reclamation or "burn-off" type furnace is provided which is modified to support one or more engine exhaust filter devices therewithin and to be connected to a source of low pressure air from exterior of the furnace to provide for combusting or incinerating, within the furnace, material accumulated on the media of the filter devices.

In accordance with still another aspect of the present invention, a reclamation or burn-off type furnace is provided which includes plural conduits for supplying combustion air in relatively low volumes and at low pressures directly to plural engine exhaust filters disposed in the furnace. The source of combustion air is external to the burn-off furnace and such air is conducted to the filter devices to be treated by suitable conduits which extend through the furnace wall, preferably, from a manifold connected to the source. During operation, as the reclamation or burn-off furnace heats the filter devices to a suitable temperature, air flowing directly through the filter devices supplies oxygen so that carbon soot and any other trapped material within the filter's ceramic honeycomb structure will be incinerated and removed as combustion products in gaseous form. The speed and completeness of reclamation, regeneration or cleaning of the filter media may be enhanced by increasing the concentration of oxygen in the combustion air supplied to the interiors of the filter devices.

Those skilled in the art will further appreciate the abovementioned advantages and superior features of the invention together with other important aspects upon reading the detailed description which follows in conjunction with the drawing.

BRIEF DESCRIPTION OF THE DRAWING

The drawing figure is a somewhat schematic diagram of an apparatus for regenerating engine exhaust filters and the like in accordance with the invention.

DETAILED DESCRIPTION OF THE PREFERRED EMBODIMENTS

In the description which follows, like parts are marked throughout the specification and drawing with the same reference numerals, respectively. The drawing figure is not intended to be to scale and certain features may be shown in somewhat schematic or generalized form in the interest of clarity and conciseness.

Referring to the drawing figure, there is illustrated in somewhat schematic form, a so-called reclamation or burn-off furnace 10 comprising an insulated, rectangular box-like structure 12 having a top wall 14, a bottom wall 16, opposed sidewalls 18 and 20 and opposite opposed sidewalls, not shown. One of the sidewalls not shown may include a suitable door for access to the furnace interior. The drawing figure may be considered to be a vertical central section view through a typical rectangular or square box-like structure comprising the housing 12. Furnace 10 includes a primary heating element or burner 22 for generating a flame 23 and connected to a source of fuel, not shown, by way of a suitable controller 24. Typical sources of fuel for burner 22 would be liquid hydrocarbon or gaseous hydrocarbon fuels, for example. Combustion takes place in a burner housing 26 and combustion products, primarily heated air, carbon dioxide and water vapor are emitted into a chamber 28 via one or more ports 27. Airflow into burner housing 26 and air flow out of the burner housing into the chamber 28 takes place in a conventional manner. In fact, the reclamation or burn-off furnace illustrated may be similar in some respects to that described in U.S. Pat. No. 4,270,898 to Kelly, issued Jun. 2, 1981 to the assignee of the present invention.

Burn-off furnace 10 includes a secondary burner 30 also operably connected to the controller 24 for generating a flame 31 in a secondary or afterburner housing 32. Heated air and combustion products generated in and existing in the chamber 28 flow through an opening or port 33, and are preferably subjected to secondary combustion prior to being vented through a stack 34 so that emissions from stack 34 comprise, essentially, inert gasses and water vapor. Temperature sensor 38 monitors the temperature in the chamber 28 so that controller 24 may adjust the intensity of heating being carried out by the burners 22 and 30. Temperature conditions in chamber 28 and stack 34 may also be controlled by a water spray controller 40 operably connected to the temperature sensor 36 and operable to provide a fine spray of water 42 by way of a nozzle 44 extending within the chamber 28.

Referring further to the drawing figure, a suitable rack or similar support structure 50 is disposed within the chamber 28 for supporting one or more engine exhaust filters, each designated by the numeral 52. The exhaust filters 52 are each characterized by a substantially cylindrical metal outer housing 53, an inlet port 54, an exhaust port 55 and a ceramic honeycomb filter media 56 disposed within the housing 53 for trapping particulate material emitted by internal combustion engines, such as gasoline and diesel engines of both piston and turbine types, for example. The exhaust filters 52 may be one of several types commercially available. The filters 52 are disposed for exposure to heated gasses circulating within the chamber 28 between burner outlet port 27 and burner inlet port 33. The filters 52 may be mounted horizontally, as shown, vertically or inclined. Vertical orientation with the exhaust ports facing upward may be preferred.

It has been determined in accordance with the invention that particulates and other materials formed by or including unburned or partially combusted hydrocarbon fuels, and trapped by the filter media 56 of the filters 52, may be removed from the media by raising the temperature of the media to about 800° F. to 900° F., or possibly higher temperatures, for predetermined periods of time. However, it has also been determined that thorough regeneration or cleaning of the filter media 56 is enhanced and the time for cleaning is shortened by circulating relatively low volumes of low pressure gas, such as ambient air, through the filter devices 52. In accordance with the invention, the apparatus 10 is preferably provided with a relatively low pressure blower or air pump 60 operable to intake ambient air and discharge pressure air to a manifold 62. Respective conduits 64, operably connected to manifold 62, extend through furnace wall 12 and are suitably sealed to prevent escape of combustion gasses from chamber 28. Conduits 64 may be connected to suitable sections of flexible conduits 66 which are releasably connected directly to the inlet ports 54 of the filter units 52 by way of suitable fittings 67, as generally shown in the drawing figure. Other arrangements of manifolding and connecting the filter units 52 to a source of low pressure air may be provided without departing from the invention. For example, the conduits 64 and 66 may be of sufficient length, or connected to respective heat exchanger means, not shown, so as to preheat the air flowing through the filters 52, preferably using heat generated in chamber 28.

In instances when the oxygen content of ambient air supplied by manifold 62 is not sufficient to burn off or incinerate all of the material or residue trapped by the filter elements or media 56, the air conducted through the filter elements by way of the manifold 62 and the respective conduits 64, 66 may be enriched by a source of oxygen 70 connected to the manifold 62 by way of a suitable control valve 72. In like manner each of the conduits 64 is also provided with a suitable control valve 74 so that the volume of air being conducted to each one of the filter devices 52 may be appropriately adjusted. A suitable check valve 76 may be interposed the manifold 62 and the blower or air pump 60.

Accordingly, in operation, the filter devices 52 may be placed in the chamber 28 and connected to the manifold 62 by way of the respective conduits 64, 66 and fittings 67. A source of combustion air containing ambient concentrations of oxygen or enhanced concentrations of oxygen may be conducted through the filter devices 52 while the temperature in the chamber 28 is raised to a suitable value, such as at least about 800° F. to 900° F. in order to oxidize or combust carbonaceous material in the filters 52. The overall method of cleaning the filter devices 52 in accordance with the invention is believed to be more efficient in that the temperature in the chamber 28 is not required to be raised as high and for as long a period of time as with prior art reclamation processes, since a suitable flow of combustion air is being supplied to the interior of the filter devices 52 in a forced manner. Of course, as combustion air flowing through the filter devices 52 exits the respective filter devices into the chamber 28 and flows to the afterburner 32, any material removed from the filter devices 52 will normally be further oxidized, if possible, since operating temperatures within the secondary or afterburner 32 may, typically, be in the range of 1200° F. to 1400° F. Typical volumes for combustion air to be conducted through the filter devices 52 range from about fifty cubic feet per hour to one hundred fifty cubic feet per hour for filters of sizes used in applications for over-the-road motor truck diesel propulsion engines, for example. Of course, the size of the filter devices 52 and the treatment time desired will dictate, to some extent, the volume of combustion air supplied by the blower or pump 60 and the pressurized oxygen source 70, if used, for example.

The construction and operation of the reclamation or burn-off furnace 10 and the method of the present invention are believed to be readily understandable to one of ordinary skill in the art based on the foregoing description. Although preferred embodiments of the invention have been described in detail sufficient to enable one skilled in the art to practice the invention, it will be appreciated that various substitutions and modifications may be made without departing from the scope and spirit of the appended claims.

What is claimed is:

1. A method for a regenerating engine exhaust filter device having a housing, a porous filter media disposed within said housing contaminated with soot and materials entrained in combustion products of an engine, said method comprising:

providing an apparatus having a burn-off furnace including an enclosure defining a heating chamber, wherein said furnace includes a support in said chamber for supporting plural filter devices, and said apparatus includes a manifold for supplying pressure air to said filter devices via conduits operable to be connected to said manifold and said filter devices, respectively; a conduit extending from the exterior of said air closure to said chamber for connection to said filter device; and a source of oxygen containing gas connected to said conduit for conduction to the interior of said filter device during heating thereof to incinerate material accumulated on said filter media;

placing a filter device in a burn-off furnace comprising an enclosure defining a chamber in which heated gasses are circulated;

heating said filter device by circulating heated gasses within said chamber; and circulating combustion air through the interior of said filter device to incinerate material trapped by filter media of said filter device.

2. The method set forth in claim 1 including the step of:

connecting said filter device to a source of relatively low pressure combustion air exterior of said chamber and circulating said combustion air through said filter media while heating said filter media with heated gasses within said chamber.

3. The method set forth in claim 2 including the step of:

raising the temperature of said filter device to at least about 800° F.

4. The method set forth in claim 2 including the step of:

providing said combustion air as ambient air by way of a blower.

5. The method set forth in claim 4 including the step of:

providing a fitting within said chamber for connecting said source of combustion air to an inlet port of said filter device.

6. The method set forth in claim 1 including the step of:

enhancing the oxygen content of said combustion air prior to introducing said combustion air to the interior of said filter device.

7. The method set forth in claim 1 including the step of:

discharging said combustion air and combustion products from said filter device into said chamber, mixing said combustion products and said heated gasses and conducting said combustion products and heated gasses through a burner prior to discharging said combustion products and said heated gasses from said furnace.

8. The method set forth in claim 1 including the step of:

preheating said combustion air prior to introduction of said combustion air into said filter device.

9. The method set forth in claim 8 wherein:

said combustion air is preheated by heat exchange with said heated gasses in said chamber.

* * * * *